United States Patent [19]

Manion

[11] Patent Number: 6,037,880
[45] Date of Patent: Mar. 14, 2000

[54] INTEGRATED PARKING METER SYSTEM

[76] Inventor: Jeffrey Charles Manion, 540 S. Forest St., Suite Q, Denver, Colo. 80222

[21] Appl. No.: 08/935,949

[22] Filed: Sep. 23, 1997

Related U.S. Application Data

[60] Provisional application No. 60/025,756, Sep. 23, 1996, provisional application No. 60/025,763, Sep. 23, 1996, and provisional application No. 60/036,000, Jan. 22, 1997.

[51] Int. Cl.$^7$ .................................................. B60Q 1/48
[52] U.S. Cl. ................. 340/932.2; 340/539; 340/870.02; 340/870.07; 340/870.09; 340/928; 235/378; 235/384; 194/902; 705/13; 705/418
[58] Field of Search ..................................... 340/506, 539, 340/932.2, 928, 870.02, 870.07, 870.09; 235/378, 384; 194/902; 705/13, 418

[56] References Cited

U.S. PATENT DOCUMENTS

| | | | |
|---|---|---|---|
| 3,141,292 | 7/1964 | Bailey et al. | 58/142 |
| 3,324,647 | 6/1967 | Jedynak | 58/142 |
| 3,999,372 | 12/1976 | Welch et al. | 58/142 |
| 4,043,117 | 8/1977 | Maresca et al. | 58/142 |
| 4,228,519 | 10/1980 | Pfeifer | 364/900 |
| 4,356,903 | 11/1982 | Lemelson et al. | 194/1 R |
| 4,823,928 | 4/1989 | Speas | 194/217 |
| 4,825,425 | 4/1989 | Turner | 368/7 |
| 4,876,540 | 10/1989 | Berthon et al. | 340/932.2 |
| 5,029,094 | 7/1991 | Wong | 364/467 |
| 5,266,947 | 11/1993 | Fujiwara et al. | 340/932.2 |
| 5,339,000 | 8/1994 | Bashan et al. | 340/932.2 |
| 5,407,049 | 4/1995 | Jacobs | 194/200 |
| 5,442,348 | 8/1995 | Mushell | 340/932.2 |
| 5,454,461 | 10/1995 | Jacobs | 194/200 |
| 5,659,306 | 8/1997 | Bahar | 340/932.2 |
| 5,737,710 | 4/1998 | Anthonyson | 340/932.2 |

*Primary Examiner*—Daniel J. Wu
*Attorney, Agent, or Firm*—Jennifer L. Bales; Macheledt Bales & Johnson LLP

[57] ABSTRACT

An integrated parking meter system automates the issuance of parking citations. Each parking meter will be equipped with a sonar range finder, mercury type switch and a two way radio that communicates via N-PCS to a host computer back at the control center. When a meter runs out of money it checks to see if a vehicle is present in the parking space. If it is, the meter notifies the host computer that there is a car illegally parked in the space. The host computer correlates the information to identify the exact location of the violator. The host computer then sends this information via wireless network to the parking meter attendants' personal communicator. The parking attendant proceeds to the violator and issues the citation. Included within this technology is the capability to remotely change the rate structure of any or all electronic parking meters. A meter diagnostic feature alerts repair personnel to specific malfunctioning meters. The meter may also set the time remaining on the meter to zero whenever a car leaves the adjacent space.

11 Claims, 14 Drawing Sheets

INTEGRATED PARKING METER SYSTEM

This application claims the benefit of U.S. Provisional Application Nos. 60/025,756, 60/025,763, and 60/036,000, respectively filed on Sep. 23, 1996, Sep. 23, 1996, and Jan. 22, 1997.

BACKGROUND OF THE INVENTION

1. Field of the Invention

This invention relates to an automated parking meter system for automating the issuance of parking citations.

2. Description of the Prior Art

Municipalities are battling never ending budget constraints and increased expenses. Many local governments are implementing their own "re-engineering government" plans. Their objectives are to increase efficiency and reduce costs, while maintaining and enhancing revenue generating activities. Parking meters are a good source of revenue for cities, as are parking tickets for parkers who do not pay for parking or move their cars when their allotted time is up.

Currently municipalities employ many parking meter attendants to randomly search for parking meter violators. When a violator is found, the parking attendant issues a citation and then continues to look for other violators. The result is that the city must employ many parking meter attendants to be effective at enforcing the parking statutes. This is a labor intensive and inefficient way for the city to conduct business.

Furthermore, when a meter fails, often the attendant does not become aware that the meter has failed for some time. Either citations are improperly issued, if the meter indicates a violation, or parkers park for free, if the meter indicates that time remains.

Revenue is also lost when a second car parks at a meter while time remains on the meter from a previously parked vehicle. Another revenue loss occurs because it is difficult to change meter schedules to account for special events.

A need remains in the art for an automated parking meter system, which can inform attendant when a violation occurs, reset meters when a vehicle leaves the space, and adjust the meter schedule conveniently.

SUMMARY OF THE INVENTION

It is an object of the present invention to provide an automated parking meter system, which can inform attendant when a violation occurs, reset meters when a vehicle leaves the space, and adjust the meter schedule conveniently.

Each parking meter will be equipped with a sonar range finder, mercury type switch and a N-PCS two way radio that communicates via N-PCS to a host computer back at the control center. When a meter runs out of money it checks to see if a vehicle is present in the parking space. If it is, the Meter Element notifies the host computer that there is a car illegally parked in the space. The host computer correlates the information to identify the exact location of the violator. The host computer then sends this information via wireless network to the parking meter attendants' personal communicator. The parking attendant receives the information of the exact location of the violator. The parking attendant proceeds to the violator and issues the citation. After the citation has been issued, the parking attendant notifies the host computer, via the wireless network to the personal communicator, indicating that the citation has been issued and in turn, the next closest violator's location is transmitted back.

Included within this technology is the capability to remotely change the rate structure of any or all electronic parking meters. This is done again by communicating to the parking meter element via wireless a network from the host computer and electronically changing the rate structure.

The Meter Diagnostic feature alerts repair personnel to specific malfunctioning meters in the same manner that the parking attendants are notified of parking violations. Meter diagnostics are performed during the early morning hours before general business commences and throughout the general business day. This feature includes the following indications;

1. Full Coin Compartment
2. Low Battery Indication
3. Meter Microprocessor Failure
4. Communications Failure
5. Meter Tamper
6. Sonar Range finder defeat The sonar range finder serves a three basic purposes. First as a control device to zero the parking meter if there is not a vehicle in the parking space. Secondly, to sense if there is a vehicle in the parking space before notifying the parking meter attendant of the presence of a violator. And third, it will sense if money has been added to a meter without a the turnover of vehicles in that parking space.

Functionally, the sonar range finders periodically check for the presence of a vehicle. If a vehicle is not detected, the range finder clears the time on the meter and puts the meter in the sleep mode to conserve battery life. This eliminates motorists from obtaining free parking time from a previously parked vehicle, thus increasing parking meter revenue. If there is a vehicle in the parking space and the meter time has elapsed, the meter notifies the parking attendant of the violator.

In the event that a person attempts to defeat the Sonar Range Finding device, a special signal will be transmitted to the host system with in 15 minutes of a person doing so.

Also a transducer (Mercury Type Switch) is located in the parking meter to detect if someone is tampering with the general parking meter. Again a signal is sent to the central computer and an attendant or the police is dispatched to the location

DETAILED DESCRIPTION OF THE PREFERRED EMBODIMENTS

Figure 1:
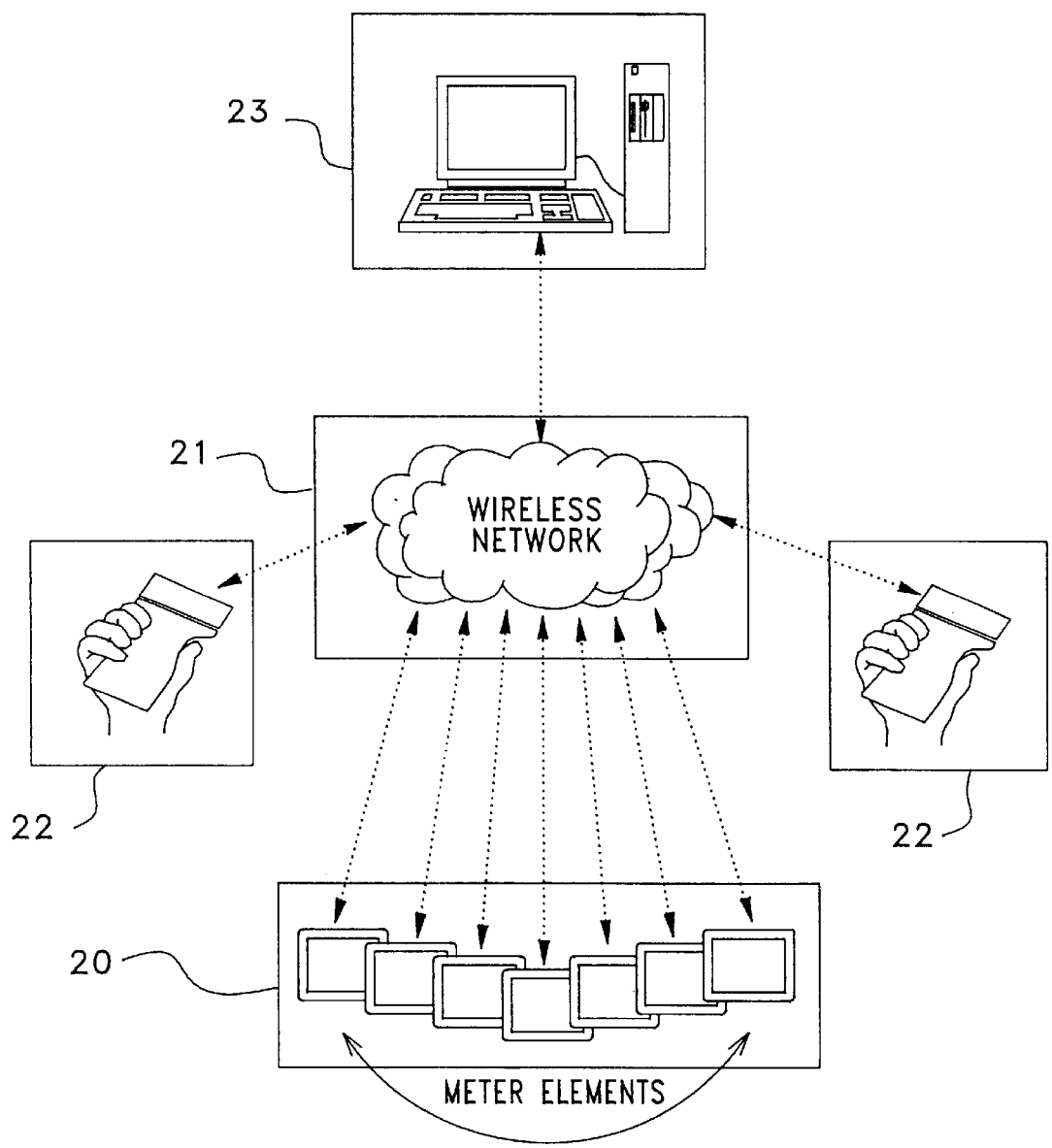
FIG. 1 shows the architecture of an Integrated Parking Meter System according to the present invention.

FIG. 1 depicts the complete Integrated Parking Meter System architecture. Each parking meter 20 will be equipped with a sonar range finder, mercury type switch and a N-PCS two way radio that communicates via N-PCS to a host computer 23 back at the control center. When a meter runs out of money it checks to see if a vehicle is present in the parking space. If it is, the Meter Element 20 notifies the host computer 23 that there is a car illegally parked in the space. The host computer 23 correlates the information to identify the exact location of the violator. The host computer 23 then sends this information via wireless network 21 to the parking meter attendants' personal communicator 22. The parking attendant receives the information of the exact location of the violator. The parking attendant proceeds to the violator and issues the citation. After the citation has been issued, the parking attendant notifies the host computer 23, via the wireless network 21 to personal communicator 22, indicating that the citation has been issued and in turn, the next closest violator's location is transmitted back.

Included within this technology is the capability to remotely change the rate structure of any or all electronic parking meters. This is done again by communicating to the parking meter element 20 via wireless network 21 from the Host computer 23 and electronically changing the rate structure.

The Host Computer 23 operating platform can be Macintosh, IBM PC, or Work Station based, equipped for high speed data communications. The Host Computer 23 electronically manages the Integrated Parking Meter System network. It will collect data from the parking meter elements, correlate the data into specific location designators and then send a notification of violator to parking attendants. During this operation, statistical data is stored and applicable reports are generated documenting utilization and parking patterns.

For Example

1. Revenue Projections Reports
2. Meter Rate Changes
3. Maintenance Reports
4. Parking Management and Activity Reports
5. Field Force Utilization Reports Other Host Computer 23 Specifications A PC Applications developer tool set for stand alone applications Pentium Processor based System 2 Gig hard drive High Speed Data Modem N-PCS, pACT/ReFlex Communications interface protocol Capabilities Spread Sheet capabilities Word Processor capabilities Mac, DOS, Window, Windows NT The Integrated Parking Meter System Application Software is a highly flexible system allowing for easy customer modification and the utilization of state of the art graphical user interface (GUI) front end.

Figure 2:
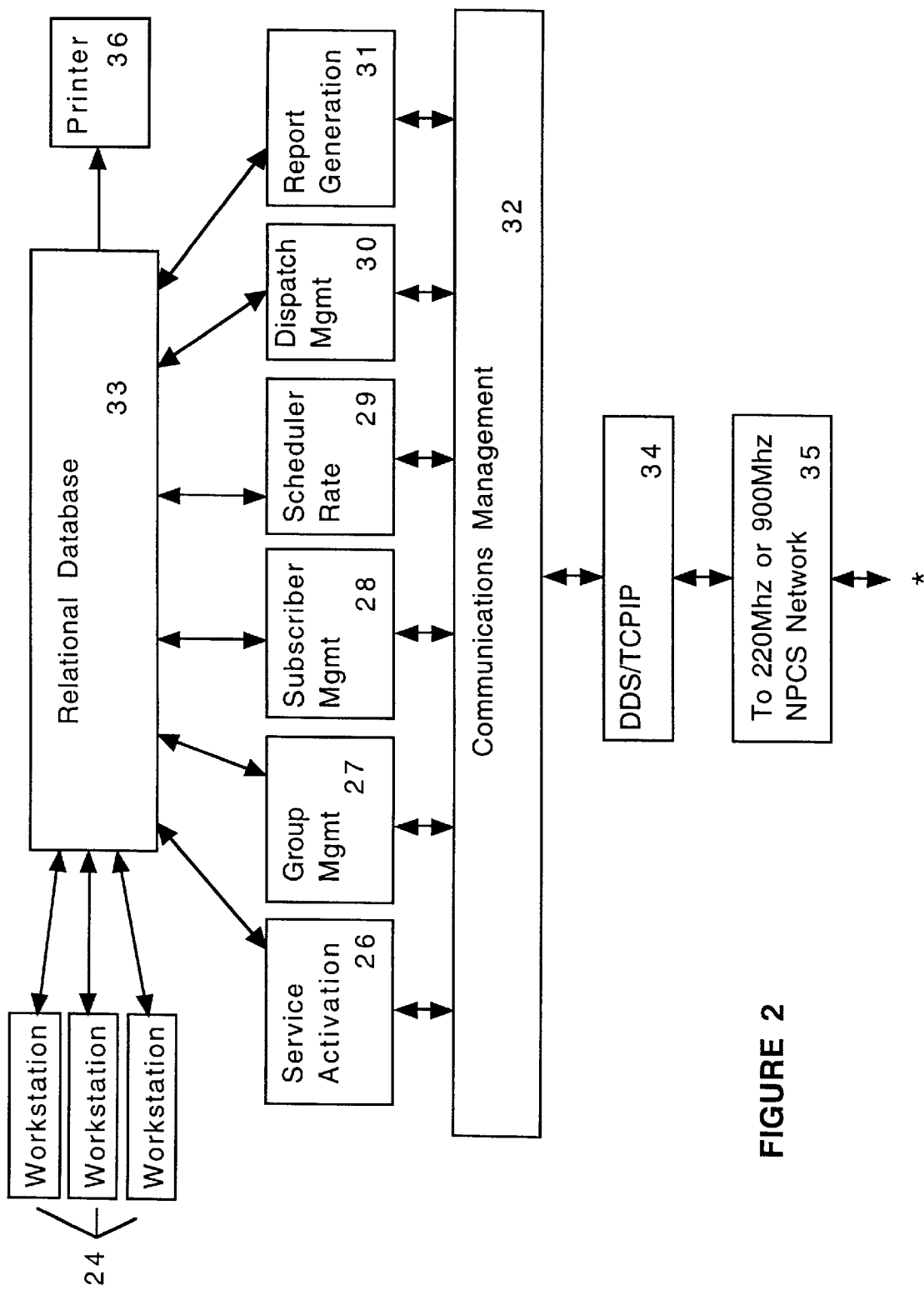
FIG. 2 shows the applications software system architecture of the system of FIG. 1.

FIG. 2 depicts the applications software system architecture. Listed below are the Operations Support System software specification. Relational database 33 communicates with several modules described in more detail below as controlled by operators via work stations 24. Dispatch Management module 30 (shown in FIG. 3) dispatches an attendant to violators, broken meters, and tampered meters. Service activation module 26 (shown in FIG. 5) coordinates the enabling and disabling serial communications with meter elements 20. Group management module 27 (shown in FIG. 6) enables grouping of meters for scheduling rates and the like. Subscriber Management Module 28 (shown in FIG. 7) tracks which meters are in service. Rate Scheduler 29 (shown in FIG. 8) operates pricing and time algorithms. Report Generation Module 31 (shown in FIG. 9) generates statistical reports to printed out on printer 36. Communications Management 32 (shown in FIG. 4) manages communications between all of the modules 26–31 and the network 35. DDS/TCPIP 34 is the interface protocol between communications management 32 and network 35.

Figure 3:
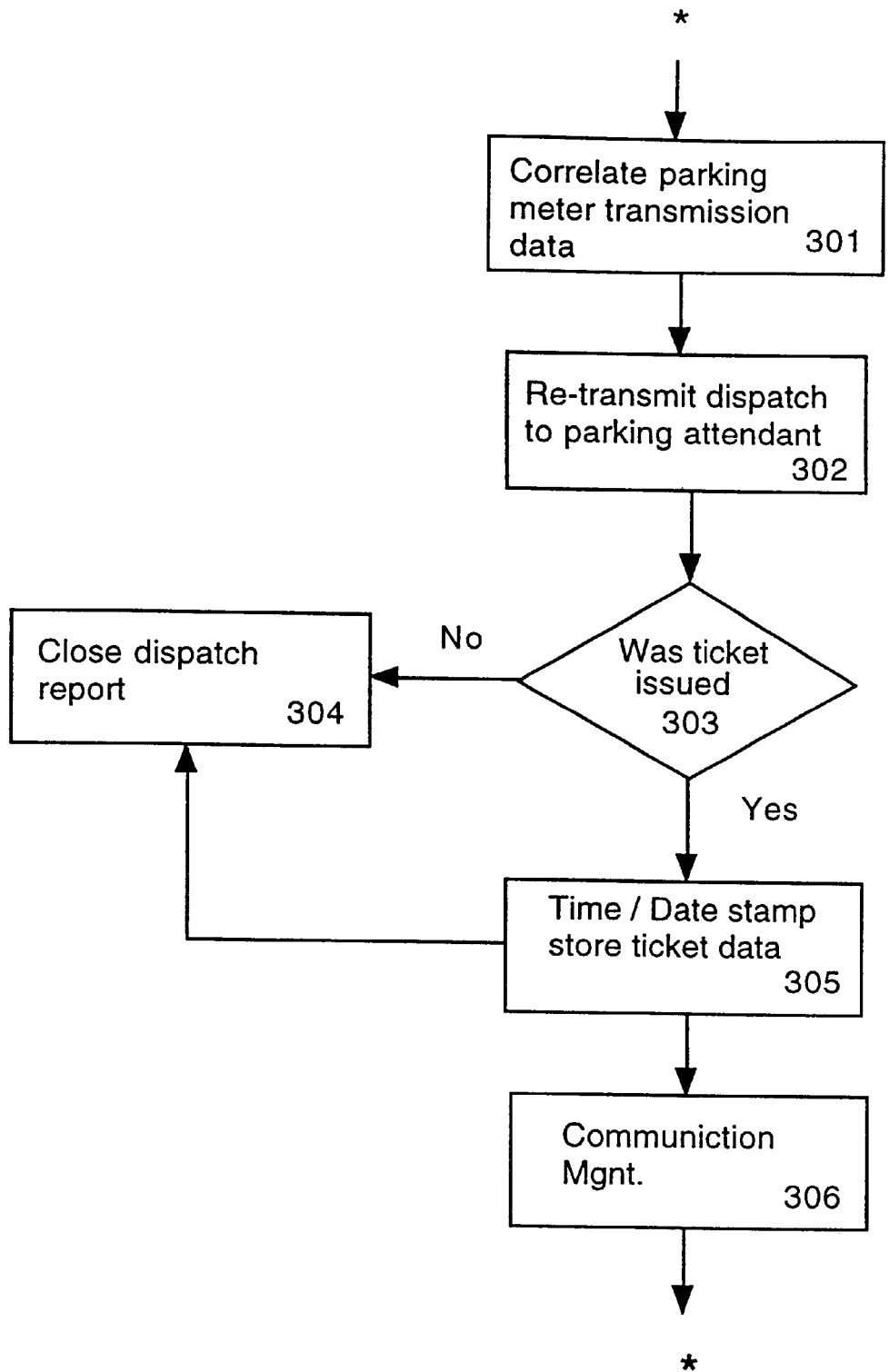
FIG. 3 is a flow chart of the operations of the Dispatch Management Module of FIG. 2.

FIG. 3 is a flow chart of the Dispatch Management Module operations. Step 301 correlates parking meter transmission data to determine where to transmit the violation notice. Step 302 re-transmits a dispatch to the correct parking attendant. If in step 303 a ticket is issued, the ticket data is stored in step 305, transmitted to communications management in step 306, and the dispatch report is closed in step 304. If not, the dispatch report is closed in step 304.

Figure 4:
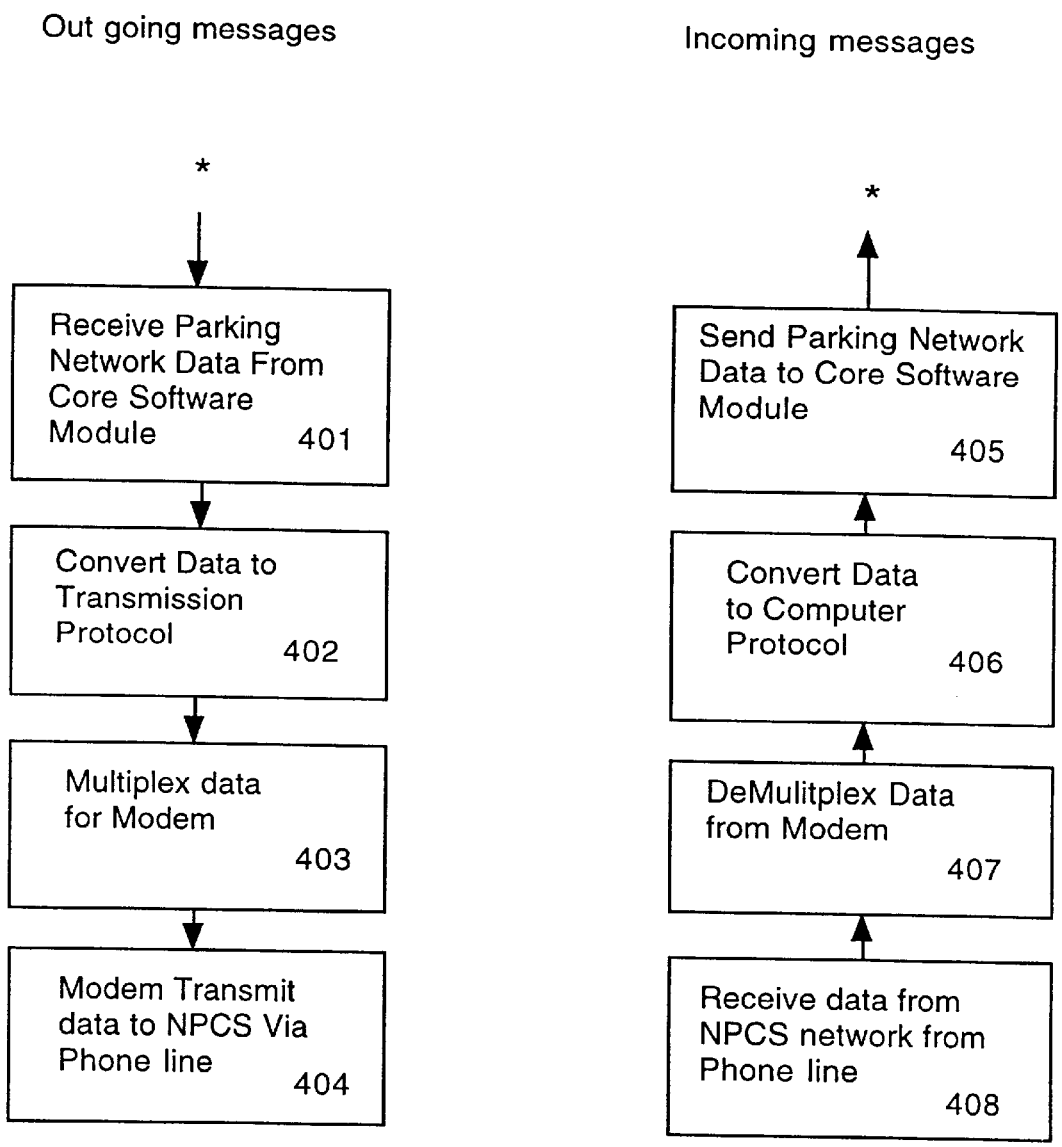
FIG. 4 is a flow chart of the Communications Management Module of FIG. 2.

Communications Management Module 32, shown in FIG. 4, represents the communications path for Meter Element, Personal Communicator, and Host Computer data flow. Regarding outgoing messages, parking network data is received from database 33 in step 401. The data is converted to a transmission protocol in step 402. The data is multiplexed for transmission by modem in step 403. The modem transmits the data over the network in step 404.

Regarding incoming messages, messages are received from the network in step 408, and are demultiplexed in step 407. The data is converted to computer protocol in step 406. The data goes to database 33 in step 405.

Figure 5:
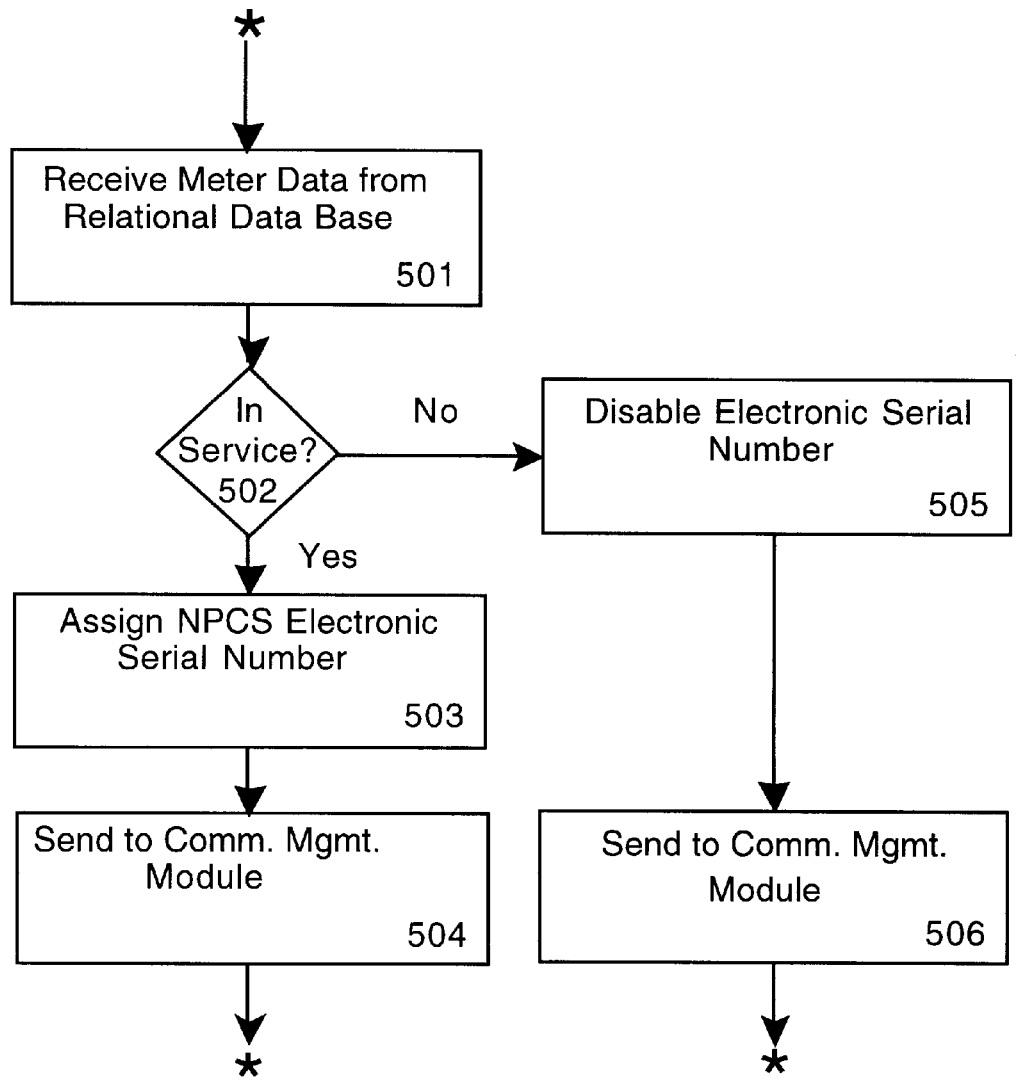
FIG. 5 is a flow chart of the Service Activation Module of FIG. 2.

FIG. 5 is a flow chart showing the operations of the Service Activation Module. Service Activation Module 26 coordinates the enabling or disabling of the electronic serial port of the meter element for service or if stolen and the personal communicators is lost or stolen. The electronic serial number is issued by the NPCS carrier to control the use of the wireless network 21. In step 501, the module receives data from the database. If the meter is in service in step 502, a serial number is assigned in step 503, and sent to communication management in step 504. If not, the serial number is disabled in step 505 and this information is sent to communication management in step 506.

Figure 6:
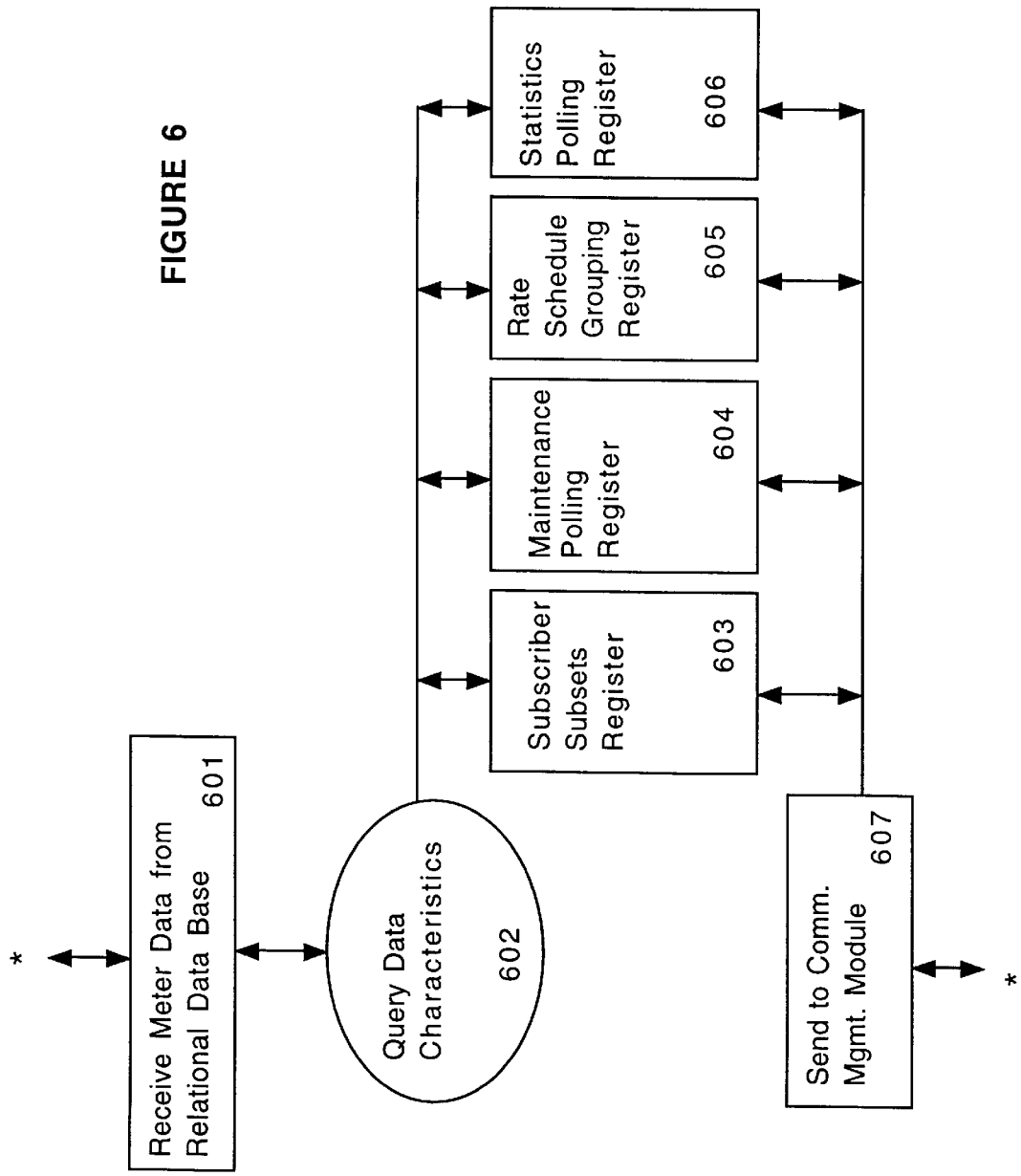
FIG. 6 is a flow chart of the Group Management Module of FIG. 2.

FIG. 6 is a flow chart showing the operations of the Group management Module 27. Group Management module 27 allows the system operator to set up special criteria groups. For instance, the operator is able to change the rate and schedule of parking, maintenance programs, or report generation.

In step 601, the module receives meter data from the database 33. Step 602 determines the characteristics of the meters to prepare for sorting. Step 603 sorts according to subscriber subsets. Step 604 sorts according to maintenance polling results. Step 605 sorts according to rate scheduling.

Step 606 sorts according to statistics polling results. In step 607, results of the sorting are sent to communications management 32.

Figure 7:
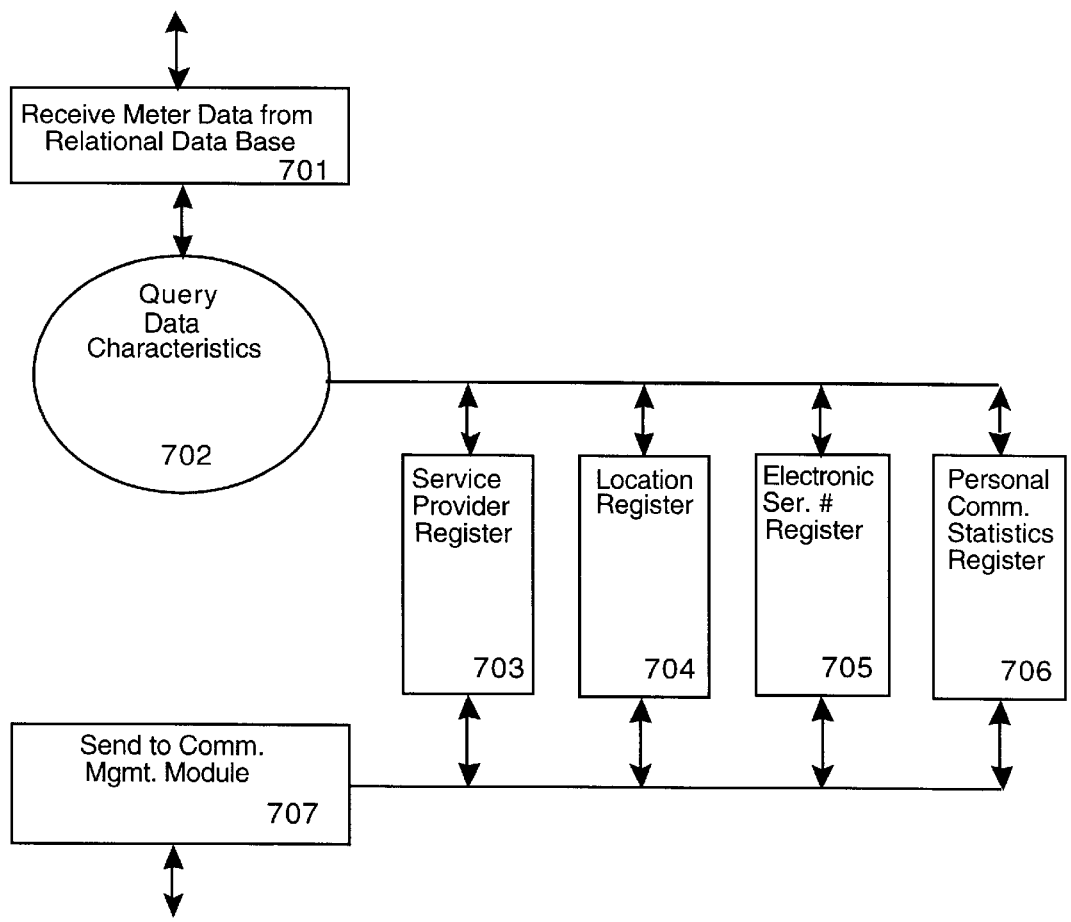
FIG. 7 is a flow chart of the Subscriber Management Module of FIG. 2.

Subscriber Management module 28, shown in FIG. 7, tracks and coordinates what meters are in service and available for revenue generation. In step 701, meter data from database 33 is provided to the module. Step 702 determines the service characteristics of the meters for sorting. Step 703 sorts the meters according to the service provider register. Step 704 sorts according to location. Step 705 sorts according to meter serial number. Step 706 sorts by the personal communicator statistics register. In step 707, the results of the sorting operations are sent to the communications module.

Figure 8:
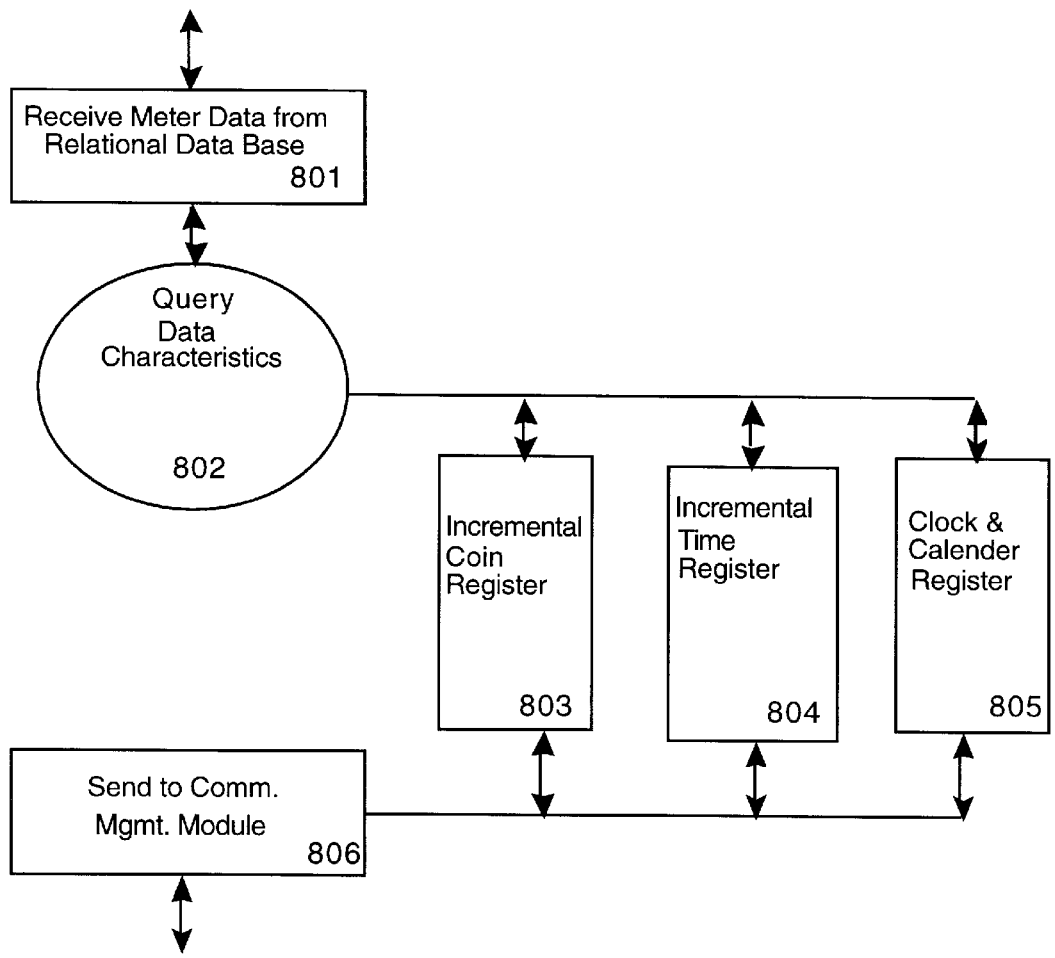
FIG. 8 is a flow chart of the Rate Scheduler Module of FIG. 2.

Rate Scheduler module 29, shown in FIG. 8, operates pricing and time algorithms for special rate and time allowed in specific areas of the city, for instance new an arena during a sporting event. In step 801, meter data from database 33 is provided to the module. Step 802 determines the characteristics of the meters for sorting. Step 803 sorts according to incremental coin register. Step 804 sorts according to incremental time register. Step 805 sorts according to incremental clock and calendar register. In step 806, the results of the sorts are sent to the communications module.

Figure 9:
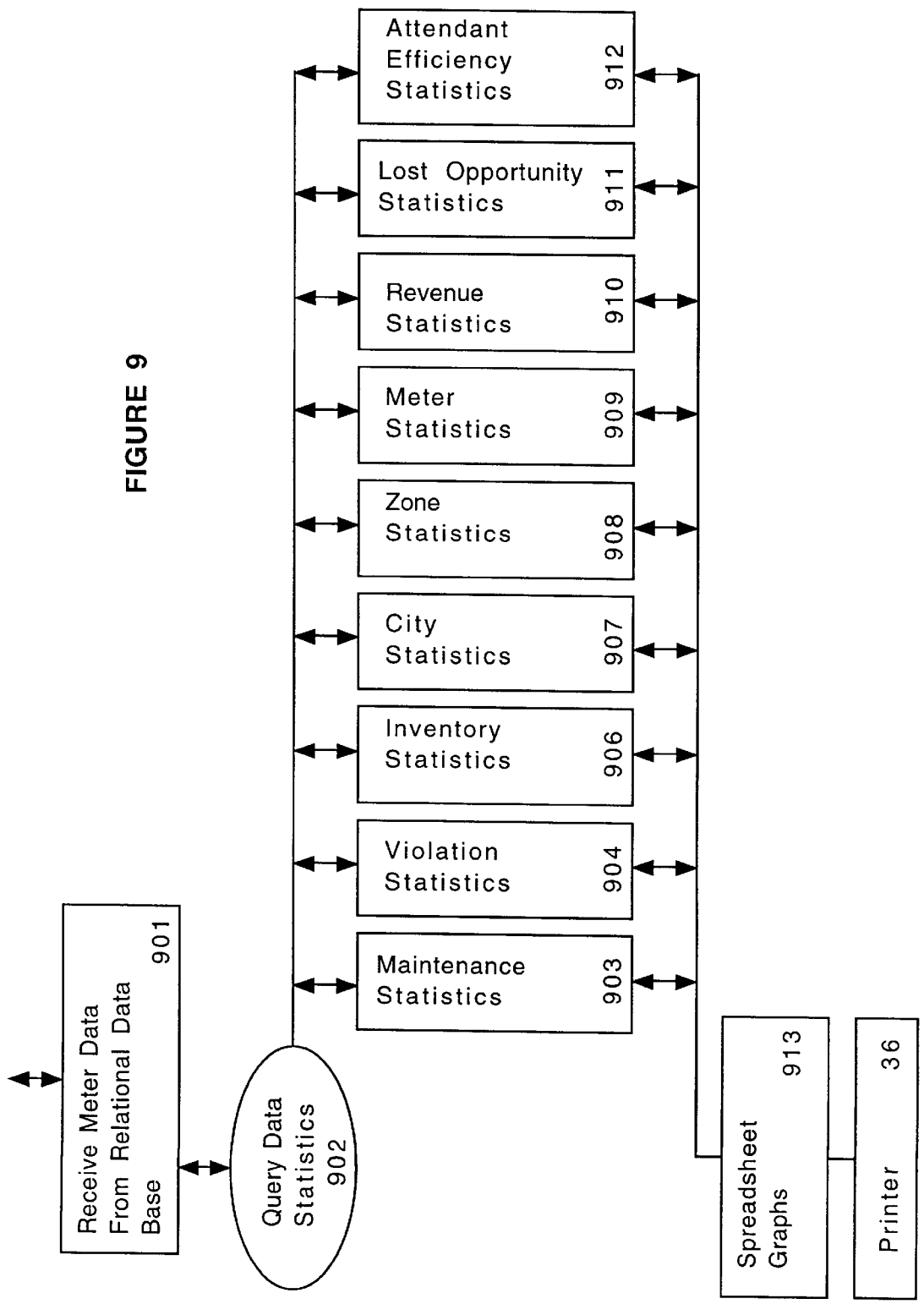
FIG. 9 is a flow chart of the Report Generation Module of FIG. 2.

The Report Generation module shown in FIG. 9 enables the administrative department to generate statistical reports specific to there municipal function. In step 901, meter data is received from database 33. Step 902 determines the characteristics of the meters for sorting. Step 903 sorts according to maintenance statistics. Step 904 sorts according to violation statistics. Step 906 sorts according to inventory statistics. Step 907 sorts according to city statistics. Step 908 sorts according to zone statistics. Step 909 sorts according to meter statistics step 910 sorts according to revenue statistics. Step 911 sorts according to lost opportunity statistics. Step 912 sorts according to attendant efficiency statistics. Step 913 prepares spreadsheet graphs to be printed by printer 36. Below are descriptions of the variables used by the statistical analyses shown in FIGS. 5 through 8.

Variable Descriptions

Global Variables

Variables that apply to all meters in all zones.

Meter Polling Interval: The interval in time between which the Host System polls the entire database of meters to determine if any meter diagnostics have failed. The first poll happens at the Data Transfer Time.

Data Transmit Time: Every 24 hours the Meters transmit statistics back to the Host System. The Data Transmit Time is the base time used by each Meter to determine when to transmit the statistics. The actual transmit time is this base time plus the offset time which is a function of the Meter Designator. This eliminates any overflow conditions that could be caused by all of the meters transmitting simultaneously.

Grace Period: The amount of time allowed between a vehicle occupying a space and a Time Expired Alarm being generated.

Hysteresis Time: The amount of time after a meter generates an alarm before it is allowed to send another alarm. This prevents multiple alarms being transmitted before the attendant can service the first alarm.

Zone Variables

Variables that apply to all meters within a given Meter one.

Hourly Rate: The rate charged for a one hour period of time.

Maximum Time: The maximum duration that any given user is allowed to occupy a parking space.

Auto Zero Enable: Enables the Time Remaining to be reset if the vehicle leaves the parking space.

City Statistics

City Statistics are the summation of all Zone Statistics for a given City. These statistics are collected on a daily, weekly, monthly and annual basis City Revenue: Total revenue received by the Meters within the City during the period.

Auto Zero Revenue: Total additional revenue potentially received by the Meters within the City during the period if the Auto Zero feature was enabled.

Avg. Time Occupied: The average time that the spaces within the City have been occupied during the period.

Lost Opportunity Count: Number of occupants that left the spaces within the City prior to the attendant ticketing the offender and resetting the alarm.

Lost Opportunity Cost: Lost Opportunity Count×Ticket Amount.

Avg. Alarm Active Time: The average time that alarms for the meters within the City were active prior to being cleared by the attendant during the period.

Max Alarm Active Time: The maximum time that any alarm for a meter within the City was active prior to being cleared by the attendant during the period.

Zone Statistics

Zone Statistics are the summation of all Meter Statistics for a given Zone.

Zone Daily Revenue: Total revenue received by the Meters within the Zone during the 24 hour period.

Auto Zero Revenue: Total additional revenue potentially received by the Meters within the Zone during the 24 hour period if the Auto Zero feature was enabled.

Avg. Time Occupied: The average time that the spaces within the Zone have been occupied.

Lost Opportunity Count: Number of occupants that left the spaces within the Zone prior to the attendant ticketing the offender and resetting the alarm.

Lost Opportunity Cost: Lost Opportunity Count×Ticket Amount.

Avg. Alarm Active Time: The average time that alarms for the meters within the Zone were active prior to being cleared by the attendant.

Max Alarm Active Time: The maximum time that any alarm for a meter within the Zone was active prior to being cleared by the attendant.

Meter Variables

Variables that apply to each meter.

Meter Zone: Indicates which Zone Variables apply to this Meter.

Meter Designator: Unique identification for the individual Meter.

Amount Inserted: The amount of money inserted into the meter for the given occupant.

Time Remaining: The (Amount Inserted/Hourly Rate)—Time Occupied

Time Occupied: The time that the space has been occupied since money was originally inserted.

Service Required Indicates if internal diagnostics have failed.

Space Occupied Indicates if the space is currently occupied.

Meter Statistics

Meter Statistics are generated for every 24 hour period from the hours of 00:00 to 24:00.

Meter Revenue: Total revenue received by the Meter during the 24 hour period

Parking Duration Paid: Total amount of parking time that occupants paid for.

Parking Duration Used: Total amount of parking time that occupants used.

Auto Zero Revenue: (Parking Duration Paid—Parking Duration Used)×Hourly Rate

Lost Opportunity Count: Number of occupants that left the space prior to the attendant ticketing the offender and resetting the alarm.

Avg. Alarm Active Time: The average time that alarms for the meter were active prior to being cleared by the attendant.

Max Alarm Active Time: The maximum time that any alarm for the meter was active prior to being cleared by the attendant.

Meter Alarms

Meter Alarms are generated instantaneously with the alarming event and cause a transmission to the attendant to be scheduled.

Time Expired: Time Remaining reached 0:00 while the Space Occupied is active.

Meter Fed: Additional money was inserted in order to extend the Time Remaining allowing the total Time Occupied to exceed the Maximum Time.

Meter Failure: Internal diagnostics failed.

Time Expired Clear: Occupant left the space with a Time Expired Active alarm. This will reset the Time Expired alarm, increment the Lost Opportunity Count and notify the attendant that the space occupant does not need to be ticketed.

Meter Molestation: On site indication that the parking meter is currently being tampered with.

Figure 10:
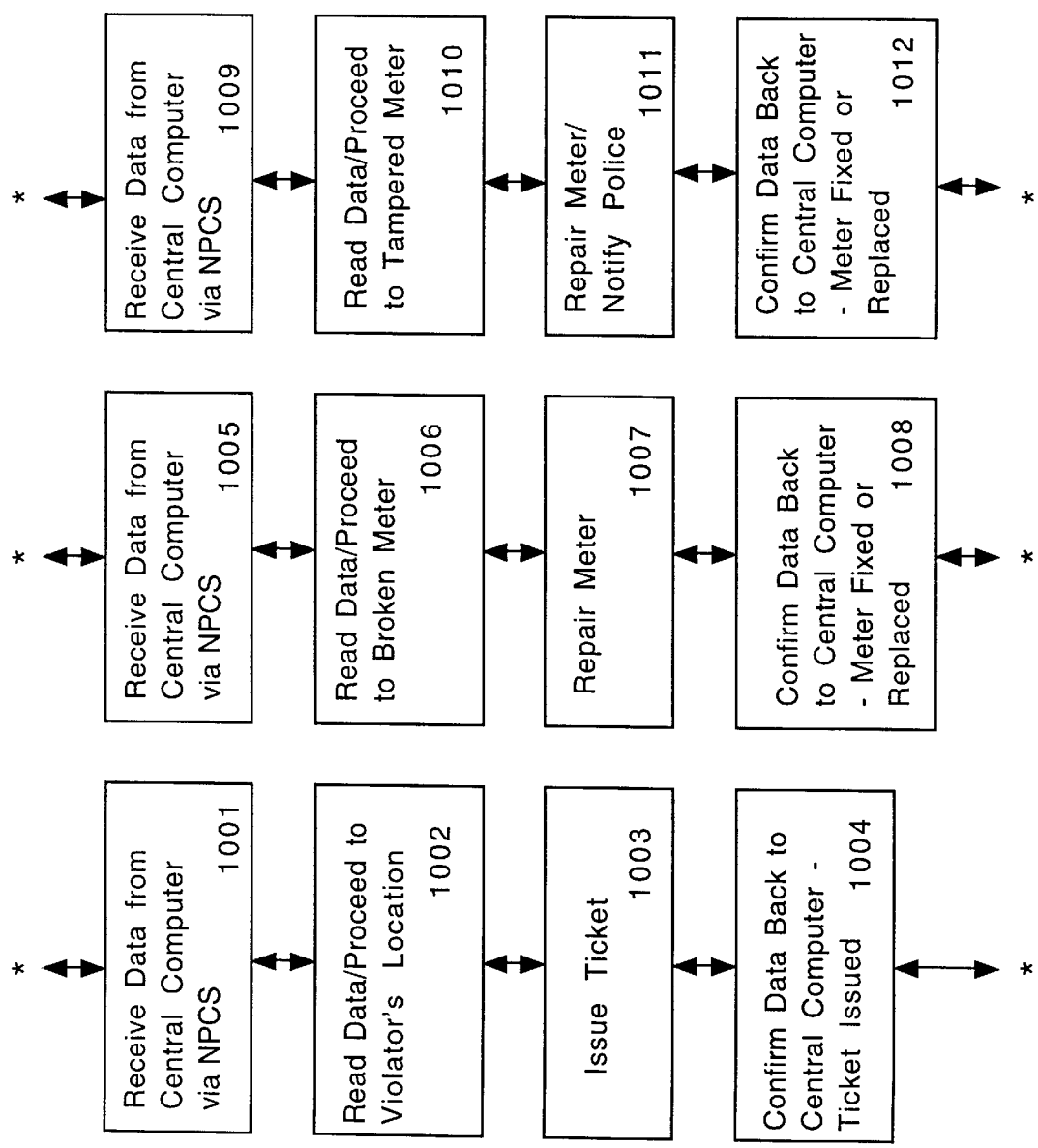
FIG. 10 is a flow chart of the operations within the personal communicator element of the system of FIG. 1.

FIG. 10 is a flow chart showing the operations of Personal Communicator 22. Personal Communicator 22 employs the basic N-PCS two way paging feature set as well as an application specific firmware package. Personal communicator 22 unit is carried by the parking meter attendants and is used to communicate parking violator locations for the issuance of parking citations. The Personal Communicator 22 also has basic computer functionality such as word processing and spread sheet capabilities.

In step 1001, communicator 22 receives data from central computer 23 indicating a violation. In step 1002, the attendant reads the data and proceeds to the violation cite. In step 1003, the attendant issues a ticket. In step 1004, the attendant confirms via communicator 22 that the ticket was issued to the central computer 23.

In step 1004, communicator 22 receives data from computer 23 indicating a broken meter. In step 1006, the attendant reads the data and proceeds to the meter. In step 1007, the attendant repairs the meter. In step 1008, the attendant confirms via communicator 22 that the meter was repaired.

In step 1009, communicator 22 receives data from computer 23 indicating that a meter has been tampered with. In step 1010, the attendant reads the data and proceeds to the meter. In step 1011, the attendant repairs the meters and notifies the police, if appropriate. In step 1012, the attendant confirms vias communicator 22 that the meter was fixed or replaced.

Communicator 22 Specifications

Receiver

Frequency Bands: 940–941 or 220–240 MHz

Channel Spacing: 5, 12.5, 25 or 50 kHz

Bit Rate: 600 bps or better

Signaling: 4 level FSK at 6400 bps

+/−2400 Hz binary

Frequency Deviation: +/−800 Hz and +/−2400 Hz for 4 level

Paging Sensitivity: 14 micro-Vim address only, best position (6400)

Image Rejection: 35 dB

Spurious Rejection: 40 dB

Selectivity: 60 dB at +/−50 kHz

Frequency Stability: 1 PPM from −1OC to +50C (REF. at +25C)

Temp. Spec: −10 to +50 degrees C

Frequency: Synthesized

Spurious Emissions: 5 nW

1 MHz Blocking: 80 dB

Transmitter

Frequency Bands: 901–902 or 220–240 Mhz range

Channel Spacing: 5,12.5, 25, and 50 kHz

Bit Rate: 9600 bps

Signaling: 4 level FSK at 9600 bps

Frequency Deviation: +/−800 Hz and +/−2400 Hz for 4 level

Emissions: meets Narrow band PCS FCC specs

Power Into Antenna: 1 W

Frequency Stability: 1 ppm

Frequency: Synthesized

Weight: 5.6 oz (grams)

Battery Life: Approx. 180 days,

Battery: 4 1.5V AAA size alkaline

User customized menu system for individual preferences

Cellular Digital Packet Data (CDPD) System Specification, pACT compliant/Reflex compliant Packet burst rate of 19.2 kbps Full Duplex, pACT Protocol and Reflex operations Antenna Diversity Battery Powered FCC, Part 15B, part 22, part 68

Canadian DOC RSS118

Figure 11:
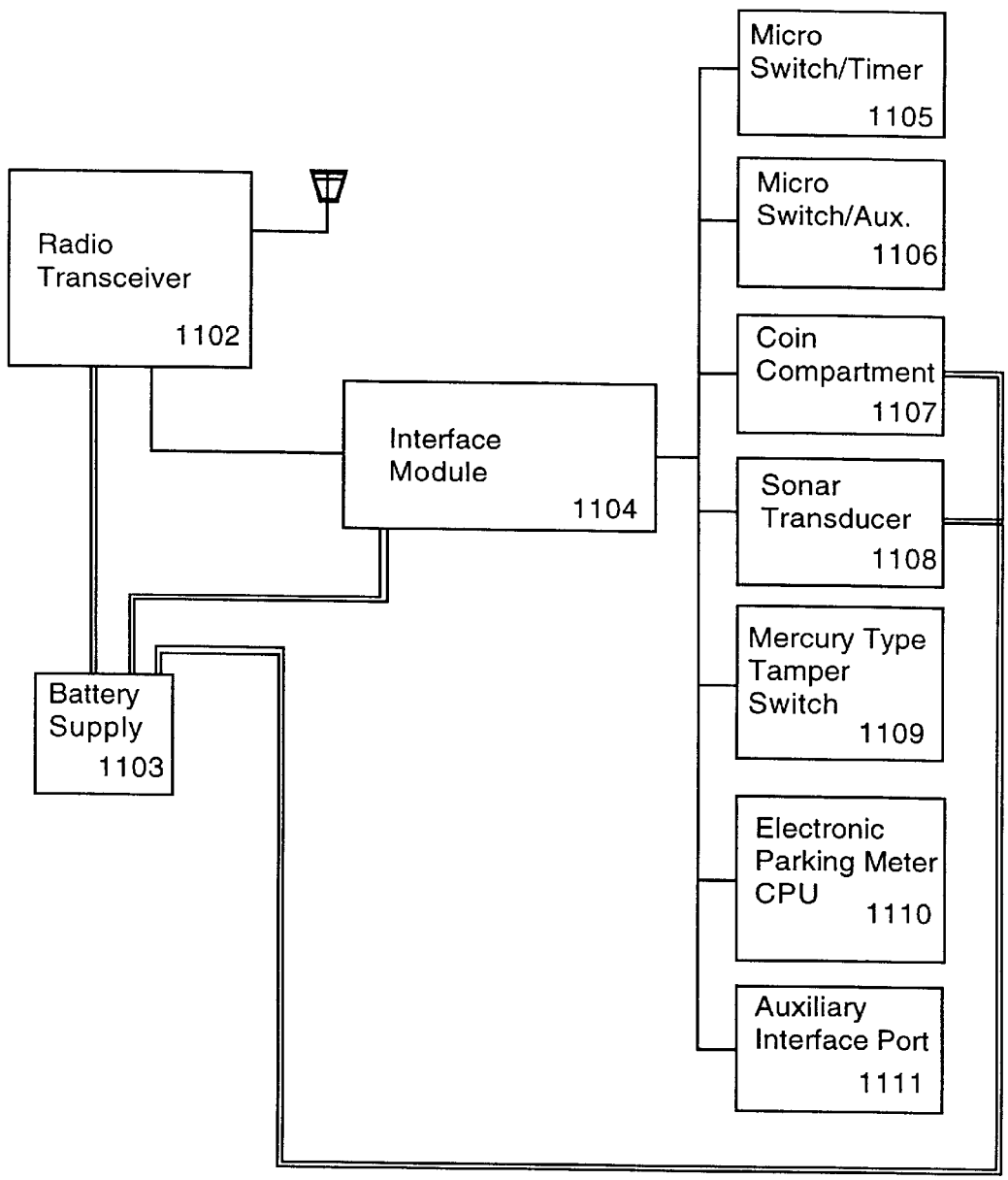
FIG. 11 is a block diagram of the parking meter element of the system of FIG. 1.

FIG. 11 shows a block diagram of parking meter 20. Parking meter 20 utilizes the N-PCS type two-way paging like pACT protocol chip set manufactured by PCSI or the ReFlex protocol chip manufactured by Motorola. It is an application specific component with only communications and very limited functionality. There will not be a display or any visible means for customer interface with this unit except for the N-PCS communications port. This limits current consumption thus increasing battery life to a minimum of 6 months.

Meter 20 is powered by battery 1103. Radio transceiver 1102 transmits and receives information over network 35 to/from computer 23. Interface module 1104 interfaces between transceiver 1102 and modules 1 105 through 1111. Timer 1105 keeps track of time remaining on the meter. Aux 1106 sets the time to zero when a vehicle leaves the space adjacent to the meter. Coin compartment 1107 receives and counts inserted coins. Sonar transducer determines whether a vehicle is in the space. Tamper switch 1 109 determines whether the meter has been hit or moved. CPU 1110 computes time remaining on the meter, resets rate structures and schedules, runs self diagnosis, and controls the other modules. Aux interface 1111 accepts changes to meter scheduling and rates from personal communicator 22.

Figure 12:
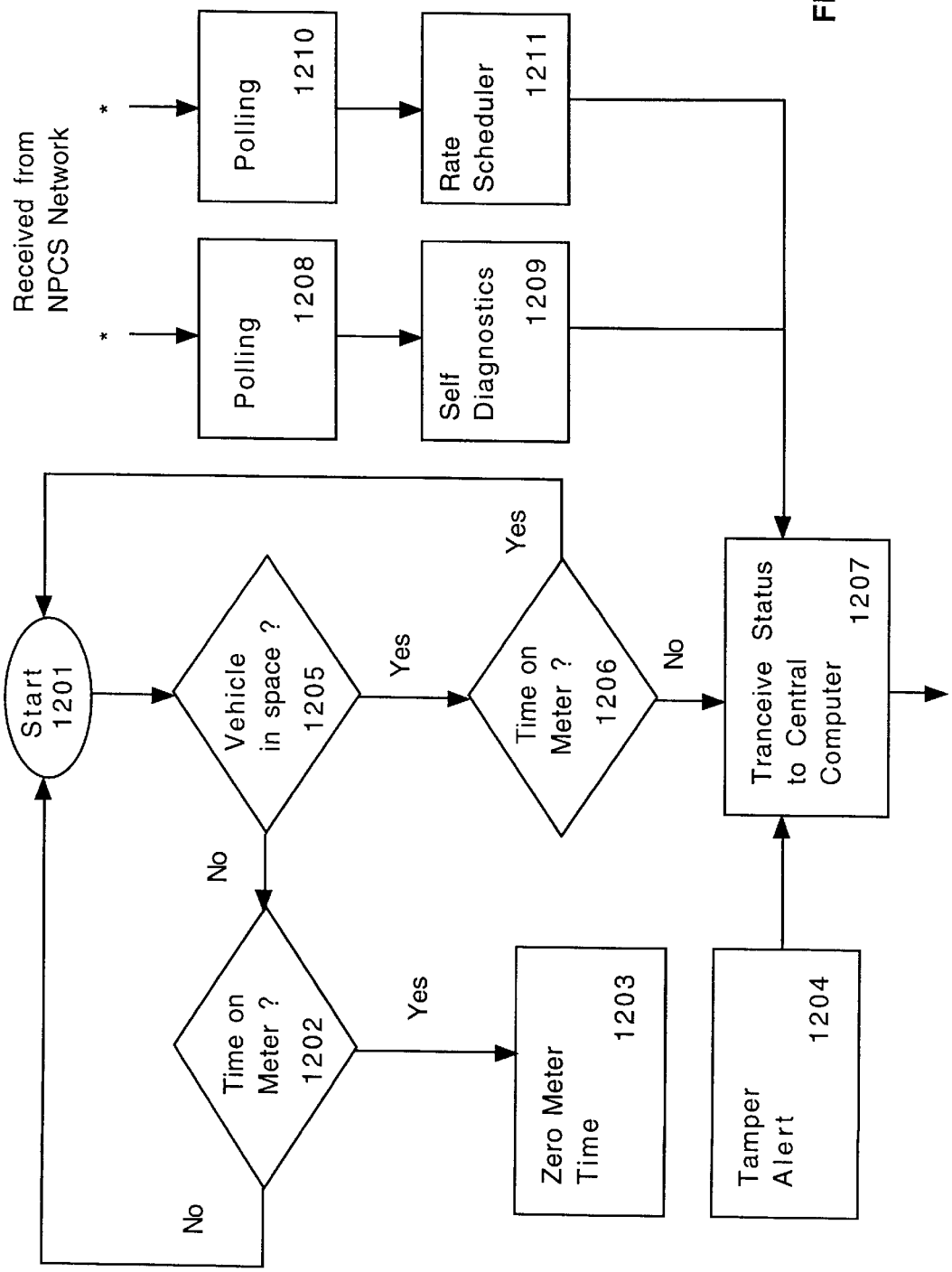
FIG. 12 is a flow chart of the operations meter element of FIG. 11

FIG. 12 is a flow chart of the operations of meter 20. The meter element 20 communicates, controls, and reports data from the parking meter itself. The parking meter can be an electronic or a mechanical parking meter of any vintage, manufacturer or style.

Step 1201 starts operations. If a vehicle is not in the spot adjacent to the meter in step 1205, and time remains on the meter, the meter time is zeroed. If there is a vehicle, and no time remains in step 1206, then the violation status is transmitted to computer 23. Similar if tamper alert 1204 is activated, this status is sent to computer 23.

In step 1208, the meter is polled for self diagnosis information. In step 1209, self diagnosis is run. The results are returned to computer 23. In step 1210, rate information is received from computer 23. In step 1211, the rate structure is reset, and confirmation is sent to computer 23. Note that because of the PCSI pACT/Motorola ReFlex chip architecture of the preferred embodiment, it is very simple to change function configurations.

Meter Element Specifications

Receiver
  Frequency Bands: 940–941 and 220–240 Mhz ranges
  Channel Spacing: 5, 12.5, 25, and 50 kHz
  Bit Rate: 6400 bps
  Signaling: 4 level FSK at 6400 bps
  +/−2400 Hz binary
  Frequency Deviation: +/−800 Hz and +/−2400 Hz for 4 level
  Paging Sensitivity: 14 micro-Vim address only, best position (6400)
  Image Rejection: 35 dB
  Spurious Rejection: 40 dB
  Selectivity: 60 dB at +/−50 kHz
  Frequency Stability: 1 PPM from −1OC to +50C (REF. at +25C)
  Temp. Spec: −10 to +50 degrees C
  Frequency: Synthesized
  Spurious Emissions: 5 nW
  1 MHz Blocking: 80 dB Transmitter
  Frequency Bands: 901–902 or 220–240 Mhz
  Channel Spacing: 5, 12.5, 25, and 50 kHz
  Bit Rate: 9600 bps
  Signaling: 4 level FSK at 9600 bps
  Frequency Deviation: +/−800 Hz and +/−2400 Hz for 4 level
  Emissions: meets Narrow band PCS FCC specs
  Power Into Antenna: 1 W
  Frequency Stability: 1 ppm
  Frequency: Synthesized
  Weight: 5.6 oz (grams)
  Battery Life: Approx. 180 days,
  Battery: 4 1.5V AAA size alkaline
  Cellular Digital Packet Data (CDPD) System Specification
  Packet burst rate of 19.2 kbps
  Full Duplex, pACT Protocol/Reflex
  Antenna Diversity
  Battery Powered
  FCC, Part 15B, part 22, part 68
  Canadian DOC RSS118

Figure 13:
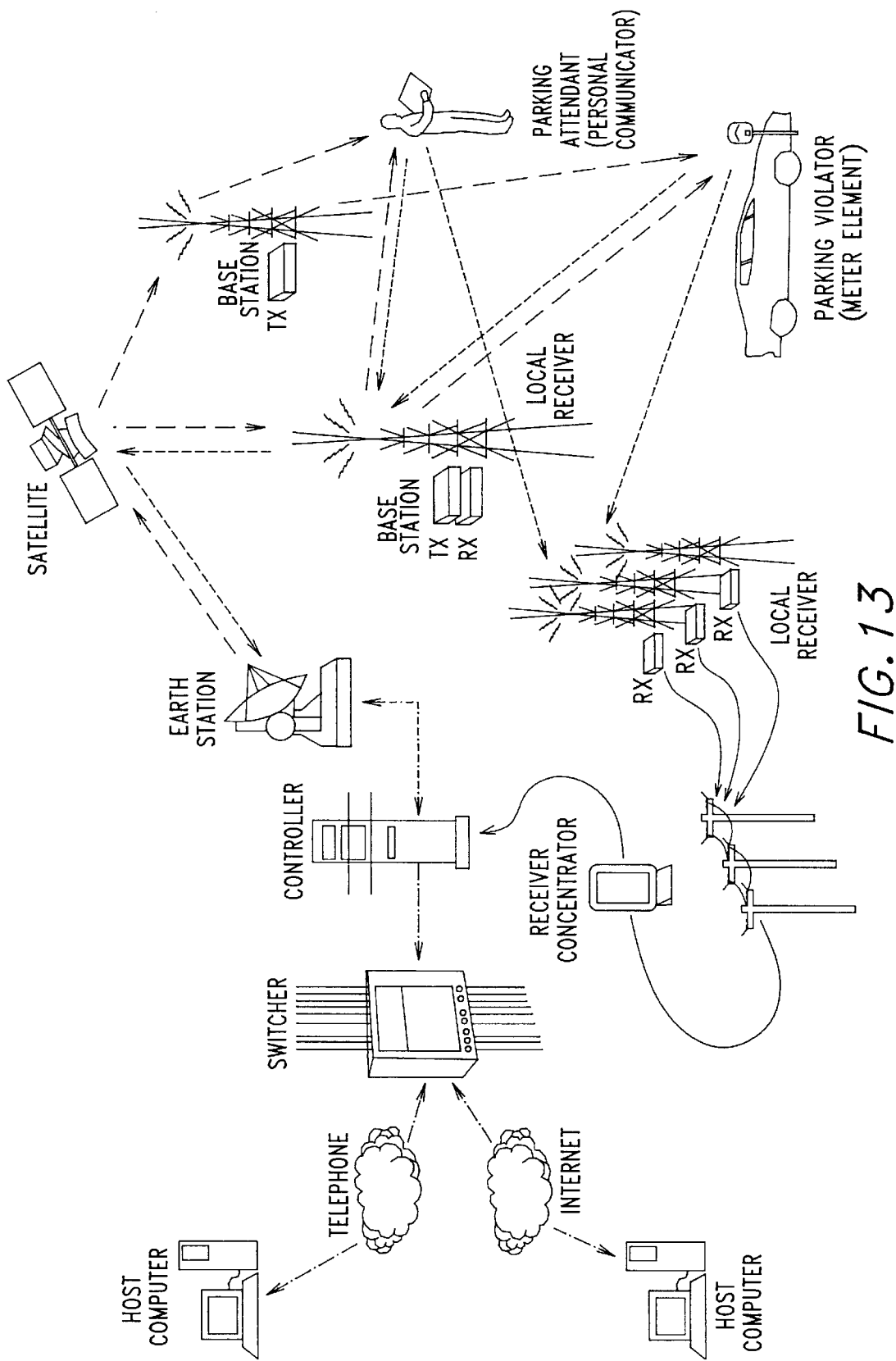
FIG. 13 shows the wireless network within which the integrated system of FIG. 1 operates.

Typical communications network and interface for the Integrated Parking Meter System wireless network is depicted in FIG. 13. The communications network will consist of a local receiver which receives transmissions from subscriber parking meter units and has a diversified antenna scheme to increase sensitivity. The local receiver is connected to a receiver concentrator which receives transmissions from multiple local receivers in a particular geographic area, preprocesses received messages into a more efficient format and funnels this information to the Controller.

The Controller batches and schedules outbound messages, coordinates inbound responses and messages with the outbound messages, performs retransmissions as required and returns message status and replies to the Switcher. The Switcher is the system administration portion of the system accepting voice and data messages over wire lines. The Switcher compresses voice pagers for transmission, maintains a subscriber registrationa/location database, communicates with other paging terminals or directly to the controller (depending on the location of the subscriber) and returns the message received status and any subscriber reply message back to the message originator. This is performed over dial up telephone lines, the internet or over the same radio system.

Figure 14:
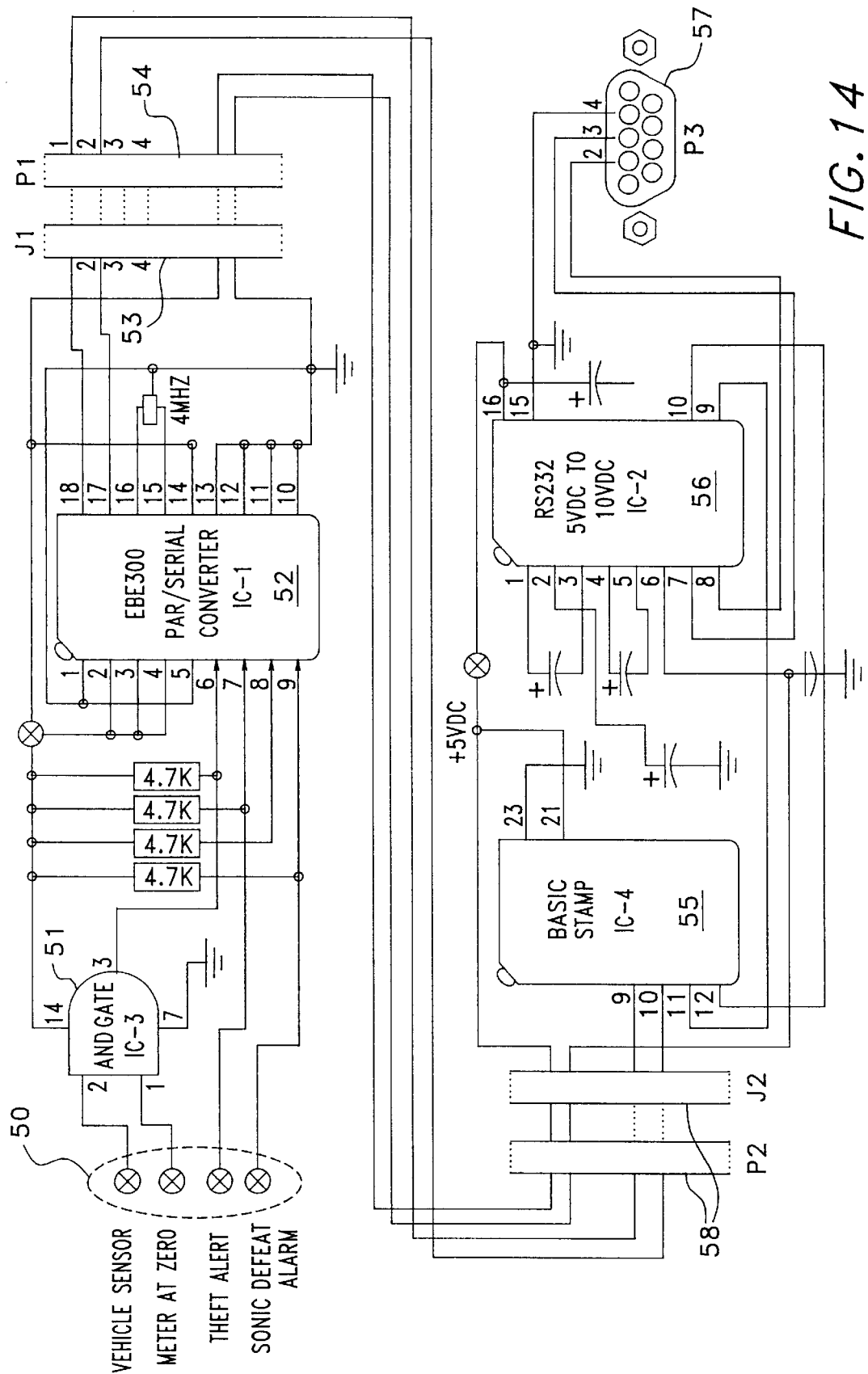
FIG. 14 is a schematic diagram showing the meter interface.

FIG. 14 shows a schematic diagram showing the meter interface. The meter interface communicates, controls, and reports data to and from the parking meter. The meter interface takes parking meter and parking space data 50 and converts it to a digital signal 51.

Transmit Mode

The digital logic data is received by the EBE300 Parallel to Serial converter (IC−1) 52. The EBE300 converts the parallel signal to an 8-bit series transported signal. The 8-bit series signal is transported from pin 18 of the EBE300 52 to pin 1 of J1 53 to P1, pin 1 54 via the wiring harness through P2 and J2, 58 to the electronic programmable read only memory (EPROM) chip IC-4 55. The EPROM 55 compares input data to a resident truth table and takes action based on the prescribed criteria. This data is then sent to the RS232 5 vdc–10 vdc chip IC-2 56 where the data signal is stepped up to standard RS232 signal levels. Once signal levels are compatible with ANCI standards it is ported to connector P3 57 and on to the transmitter.

Receive Mode

Data is received from the transmitter and sent to P3 57. The digital signal follows the receive conductor to IC−2 56. Where its amplitude is reduced from 10 vdc to 5 vdc. The groomed signal level is intern to the EPROM, IC-4 55. The EPROM then compare the transmitted data an embedded truth table where the appropriate action is directed and carried out by the EPROM 55.

While the exemplary preferred embodiments of the present invention are described herein with particularity, those skilled in the art will appreciate various changes, additions, and applications other than those specifically mentioned, which are within the spirit of this invention.

What is claimed is:

1. An integrated parking meter system comprising:
   a plurality of parking meters;
   a plurality of personal communicators;
   a central computer;
   means for communicating between the computer and the meters; and
   means for communicating between the computer and the communicators;
   wherein each meter includes means for indicating to said computer when a violation is occurring at the meter, and said computer includes means for indicating the violation to a selected communicator; and
   wherein said means for communicating between the computer and the meters includes— a Narrowband PCS antenna attached to each meter;

a meter transceiver attached to each Narrowband PCS antenna; and a local transceiver including means for communicating with a plurality of meter transceivers and means for communicating remotely with the computer.

2. The system of claim 1 wherein said means for indicating comprises:

means for determining that no time remains on the meter; and means for determining that a vehicle is parked in a space adjacent to the meter.

3. The system of claim 2 wherein said means for determining that a vehicle is parked includes a sonar range finder.

4. The system of claim 1, further comprising:

a receiver concentrator; and a plurality of spaced apart local transceivers, each local transceiver including means for communicating with the receiver concentrator and means for communicating with meters located near said local transceiver.

5. The system of claim 1, wherein each meter further includes a battery for powering the transceiver.

6. The system of claim 1 wherein said means for communicating with meter transceivers communicates in the 900 MHz and above range.

7. The system of claim 6 wherein said means for communicating with meter transceivers includes means for sending packetized digital data over a carrier based communications system.

8. The system of claim 1 wherein each meter further includes means for communicating with a plurality of other meters.

9. The system of claim 1 wherein said means for communicating between the computer and the communicators utilizes a third party narrow band paging system and operates in the 900 MHz and above region.

10. The system of claim 1, wherein each meter further comprises:

a tamper switch for detecting when the meter has been disturbed; and means for indicating the disturbance to the computer.

11. The system of claim 10, wherein the tamper switch comprises a mercury switch.

\* \* \* \* \*

UNITED STATES PATENT AND TRADEMARK OFFICE
CERTIFICATE OF CORRECTION

PATENT NO.  : 6,037,880
DATED       : March 14, 2000
INVENTOR(S) : Jeffrey Charles Manion It is certified that error appears in the above-indentified patent and that said Letters Patent is hereby corrected as shown below:

Column 8, line 52, delete "1 105" and insert --1105--.

Column 8, line 57, delete "1 109" and insert --1109--.

Column 9, line 31, delete "60 dB" and insert --60dB--.

Column 9, line 37, delete "80 dB" and insert --80dB--.

Column 9, line 58, delete "19.2 kbps" and insert --19.2kbps--.

Column 10, line 36, delete "10 vdc" and insert --10vcd--.

Column 10, line42, delete "10 vdc" and insert --10vdc--.

Column 10, line 42, delete "5 vdc and insert --5vdc--.

Signed and Sealed this

Third Day of April, 2001

*Attest:*

NICHOLAS P. GODICI

*Attesting Officer*  *Acting Director of the United States Patent and Trademark Office*